United States Patent [19]

Matsui et al.

[11] Patent Number: 5,601,917
[45] Date of Patent: Feb. 11, 1997

[54] PAINT FILM-PROTECTIVE SHEET

[75] Inventors: Komaharu Matsui, Kanagawa; Takeshi Eda; Hiroshi Ueda, both of Hyogo; Kenichi Shibata, Osaka; Toshitaka Suzuki, Osaka; Hiroyoshi Onishi, Osaka; Kenichi Okada, Osaka; Tsuyoshi Inoue, Osaka; Mitsuru Horada, Osaka; Kenji Sano, Osaka; Keiji Hayashi, Osaka, all of Japan

[73] Assignees: Nitto Denko Corporation, Osaka; Kansai Paint Co., Ltd., Hyogo, both of Japan

[21] Appl. No.: 541,976

[22] Filed: Oct. 10, 1995

[30] Foreign Application Priority Data

Oct. 11, 1994 [JP] Japan ................................ 6-334726
Apr. 19, 1995 [JP] Japan ................................ 7-119130

[51] Int. Cl.$^6$ ................................................ B32B 7/12
[52] U.S. Cl. ...................... 428/356; 428/355; 428/40.1; 525/316
[58] Field of Search ............................ 428/356, 355, 428/343, 40.1; 525/316, 227, 93

[56] References Cited

U.S. PATENT DOCUMENTS

| 4,581,281 | 4/1986 | Gerace | 428/355 X |
| 4,751,121 | 6/1988 | Kühnel | 428/355 X |
| 4,822,655 | 4/1989 | Foster | 428/356 X |
| 5,127,974 | 7/1992 | Tomiyama et al. | 156/85 |

FOREIGN PATENT DOCUMENTS

519278A2  6/1992  European Pat. Off. .

OTHER PUBLICATIONS

Abst of EPA 519,278A2 cited above.

Jap Abst JO2199184, Jul. 1990, Hitachi Chemical KK.

*Primary Examiner*—Daniel Zirker
*Attorney, Agent, or Firm*—Sughrue, Mion, Zinn, Macpeak & Seas

[57] ABSTRACT

A paint film-protective sheet comprising a supporting substrate having formed thereon a rubber-based pressure-sensitive layer comprising a rubber-based polymer having a low polarity and which does not contain unsaturated bonds or contains a small amount of unsaturated bonds, and a high-polar additive. The paint film-protective sheet can adhere even to a paint film which is liable to cause a poor adhesion by bleeding, etc., without need of applying a cleaning treatment, can maintain the good adhered state over a long period of time, and can be easily peeled cleanly even after adhering for a long period of time.

7 Claims, No Drawings

PAINT FILM-PROTECTIVE SHEET

FIELD OF THE INVENTION

The present invention relates to a paint film-protective sheet which can adhere well even to a paint film which is liable to cause a poor adhesion, can easily be peeled after adhering for a long period of time, and is suitable for the surface protection of automobile bodies and parts, coated steel plates, etc.

BACKGROUND OF THE INVENTION

In the case of loading trucks or ships with coated automobiles, the parts thereof, etc., and transporting them to remote places such as overseas, etc., an effective means for preventing the paint films from being damaged, dulled, discolored, etc., by various suspensions or collisions of dusts, rains, stone particles, etc., has been desired.

Hitherto, materials coated with a wax series coating materials at a thickness of from 5 to 20 μm have been known as such a preventing means. However, this method has various problems that it is difficult to form the wax coating at a uniform thickness, whereby a uniform coated film is difficult to obtain, the coated film is liable to be stained and has a poor resistance to acidic rain, the application of the wax coating and the removal thereof require much labors, the use of a solvent, the treatment of waste liquids, etc., are liable to cause environmental problems, etc.

On the other hand, various surface protective sheets each comprising a supporting substrate having formed thereon a pressure-sensitive adhesive layer are known. A surface protective sheet comprising a supporting substrate having formed thereon a radiation-curable pressure-sensitive adhesive layer having a low glass transition point is proposed as a surface protective sheet for an adherend having a paint film as described in JP-A-2-199184 (the term "JP-A" as used herein means an "unexamined published Japanese patent application"). Also, the present inventors proposed a paint film-protective sheet using a rubber-based polymer such as polyisobutylene as a pressure-sensitive adhesive as described in JP-A-6-73352 corresponding to U.S. patent application Ser. No. 08/368,401 filed Jan. 3, 1995. The problems described above can be overcome by such sheet systems.

However, there is a problem that according to the kind of the paint film, the paint film causes a problem of poor adhesion such that the paint film is poor in the adhesive force from the beginning or lowers the adhesive force with the passage of time to cause a peeling phenomenon, whereby, as the case may be, the paint film cannot substantially be practically used for the surface protection.

In the course of various investigations for overcoming the above-described problems, the present inventors have clarified that the above-described poor adhesion problem is caused by bleeding unreacted low molecular weight components in the paint film and the leveling agent compounded in the coating composition for preventing the occurrence of cissing at coating, on the surface of the paint film. That is, by such bleeding, a layer having a weak cohesive force is formed on the surface of the paint film and the layer inhibits development of the adhesive force.

If the above problem is overcome by a method of cleaning the surface of the paint film to remove the inhibiting materials and then adhering a surface protecting sheet to the surface of the paint film, much labors are required for the cleaning treatment, whereby the technical merit for the method of applying the wax paint film is greatly reduced. Thus, the inventors attempted to overcome the above problem by increasing the adhesive force. However, since it was difficult to balance the initial adhesive force and the easily peeling property at peeling, a satisfactory result could not be obtained.

SUMMARY OF THE INVENTION

Accordingly, an object of the present invention is to provide a paint film-protective sheet which can apply to a paint film which is liable to cause a poor adhesion by bleeding, etc., without need of applying the cleaning treatment, can continue a good adhered state for a long period of time, and can be easily peeled after adhering for a long period of time.

According to the present invention, there is provided a paint film-protective sheet comprising a supporting substrate having formed thereon a rubber-based pressure-sensitive adhesive layer comprising a rubber-based polymer having a low polarity and which does not contain unsaturated bonds or contains a small amount of unsaturated bonds, and a high-polar additive having absorbing capacity (hereinafter referred to as a "high-polar additive").

DETAILED DESCRIPTION OF THE INVENTION

The present invention is described in detail below.

By the constitution described above, a paint film-protective sheet which shows a good adhesive force to a sparingly adhesive paint film showing a poor adhesion by bleeding, thereby maintaining the adhered state over a long period of time, and at peeling, shows a good peeling property and can be easily peeled is obtained. Accordingly, without need of applying a cleaning treatment to the paint film, the sheet can be practically used as a paint film-protective sheet.

The sparingly adhesive paint film described above means a paint film having a contact angle of n-hexadecane to the paint film surface of at least 15°. It has hitherto been known that hindered phenols and amines are effective as an antioxidant and an ultraviolet absorbent. However, it has not been utterly known that these phenols and amines show the improving effect of the adhesive force to such a sparingly adhesive paint film. Thus, this is a novel finding which has never been anticipated.

The mechanism for exhibiting the above function and effect has not yet been clarified. However, from the fact that in the case of using polymers other than the above rubber-based polymer, even when the same high-polar additive is compounded with such a polymer, the effect of improving the adhesive force, etc., is not obtained, the inventors consider that when the rubber-based polymer is compounded with the high-polar additive, a specific compatible state that the high-polar additive is omnipresent near the interface of the rubber-based pressure-sensitive adhesive layer is formed, and the bleed components from the paint film are adsorbed via the additive and diffuse in the inside of the pressure-sensitive layer to prevent the formation of an adhesive layer having a weak cohesive force by the bleed components on the surface of the paint film, whereby the adhesive state which exhibits the adhesive force can be formed and the adhered state is maintained.

The paint film-protective sheet of the present invention comprises a supporting substrate having formed thereon a rubber-based pressure-sensitive adhesive layer comprising a rubber-based polymer having a low polarity and which does not contain unsaturated bonds or contains a small amount of unsaturated bonds, and a high-polar additive.

In the present invention, a proper material may be used as the supporting substrate. In general, a single substance film, a composite film, a film of a mixture, comprising a plastic or plastics such as polyethylene, polypropylene, polyester, etc.; porous films having a gas permeability, etc.; papers; non-woven fabrics; etc., are used. The thickness of the supporting substrate is generally from 5 to 300 μm, and preferably from 20 to 100 μm, but the thickness thereof is not limited to these values.

The rubber-based polymer used for forming the pressure-sensitive adhesive layer in the present invention has a low polarity of about 8.1 $(cal/cm^3)^{1/2}$ or less as an SP value and does not contain unsaturated bonds or contains a small amount of unsaturated bonds. Where other rubber-based polymers which do not have such features are used, the specific compatible state that the high-polar additive is omnipresent is not formed.

The term "a small amount of unsaturated bonds" means that the content of aliphatic unsaturated carbon=carbon bonds is 5% or less, and preferably 3% or less. The term "content of aliphatic unsaturated carbon=carbon bonds" means the percentage (%) of the aliphatic unsaturated carbon=carbon bonds based on the sum of the aliphatic unsaturated carbon=carbon bonds and other bonds in the polymer main chain.

Examples of the rubber-based polymer which can be used in the present invention include polyisobutylene, and a butyl rubber.

The rubber-based polymers can be used alone or as a mixture thereof. In addition, as the mixed system in the case of polyisobutylenes, a mixture of a high molecular weight type having a viscosity average molecular weight of at least 100,000 and a low molecular weight type having a viscosity average molecular weight of less than 100,000 at a weight ratio of from 95:5 to 50:50 is preferably used.

The additive used in the present invention is an additive having a high polarity. From the points of forming the specific compatible state that the high-polar additive is omnipresent near the interface of the pressure-sensitive adhesive layer, the improvement of the adhesive force to the poor adhesive paint film, etc., phenol series compounds and amine series compounds such as primary amine compounds, secondary amine compounds, etc., each having a molecular weight of at least 500 g/mol, and preferably at least 700 g/mol, are preferably used. Also, these compounds having a molecular weight up to about 50,000 g/mol can be used in the present invention. The solubility parameter of the high-polar additives used in the present invention is at least 9.5 $(cal/cm^3)^{1/2}$, and preferably up to about 18 $(cal/cm^3)^{1/2}$.

The solubility parameter (SP value) is the value calculated from the fundamental structural formula of a compound by the values of Δei and ΔVi at 25° C. proposed by Fedors in the following formula [*Gijutsusha no tameno Jitsugaku Kobunshi* (*Practical Learning Polymer for Technicians*), pages 71 to 77, edited by Kodansha Scientific].

SP Value $(\delta) = \sqrt{(\Sigma \Delta ei / \Sigma \Delta Vi)}$ $(cal/cm^3)^{1/2}$ wherein Δei is evaporation energy of an atom or an atomic group, and ΔVi is a mol volume of an atom or an atomic group.

In the high-polar additive, hindered series compounds are preferably used as the phenol series compounds and the amine series compounds.

Examples thereof are pentaerythrityl-tetrakis[3-(3,5-di-t-butyl-4-hydroxyphenyl)propionate] represented by the following formula (A), 1,3,5-trimethyl-2,4,6-tris(3,5-di-t-butyl-4-hydroxybenzyl)benzene represented by the following formula (B), tris-(3,5-di-t-butyl-4-hydroxybenzyl)-isocyanurate represented by the following formula (C), and poly [{6-(1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imino}] represented by the following formula (D).

Furthermore, alkylphenol resins represented by the following formula (E) are preferably used as the phenol series compounds.

The alkylphenol resin is a compound obtained by addition condensation reaction of a so-called alkylphenol having an alkyl group at the benzene ring of the phenol, and formaldehyde.

In this case, an acid or an alkaline material is used as a catalyst.

Examples of the alkyl group which is preferably used include an alkyl group having from 1 to 10 carbon atoms, and preferably from a butyl group having 4 carbon atoms to an octyl group having 8 carbon atoms. These alkyl groups may be straight chain alkyl groups or branched alkyl groups.

Two or more kinds of alkyl groups may be contained in one molecule, and a mixture of two or more kinds of resins each having a different alkyl group can be used.

As the amine series compounds, a so-called primary amine compound having —$NH_2$ group in the molecule or a so-called secondary amine compound having a >NH group in the molecule are used. Specifically, ethylamine and diethylamine are illustrated.

In the primary or secondary amine compound having a —$NH_2$ group or a NH group in the molecule, respectively, the hindered series compound is more preferred.

Examples of the hindered phenol series amino compound include 2,4-bis-(n-octylthio)-6-(4-hydroxy-3,5-di-t-butylanilino)-1,3,5-triazine represented by the following formula (F) and octylated diphenylamine represented by the following formula (G).

Example of the hindered amine series compound is bis(2,2,6,6-tetramethyl-4-piperidyl)sebacate represented by the following formula (H).

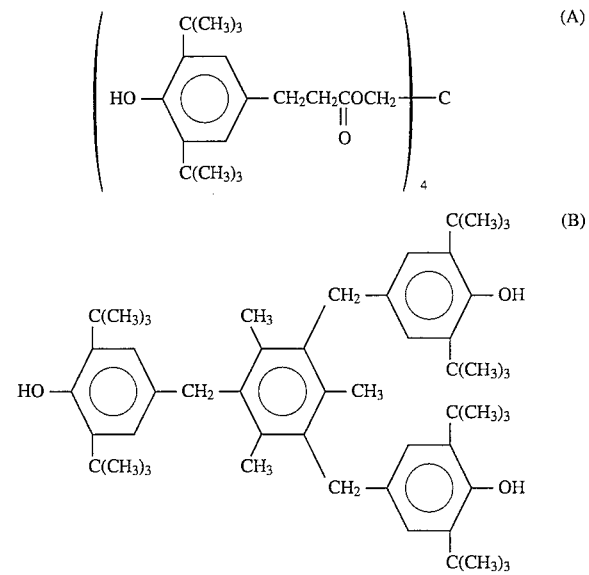

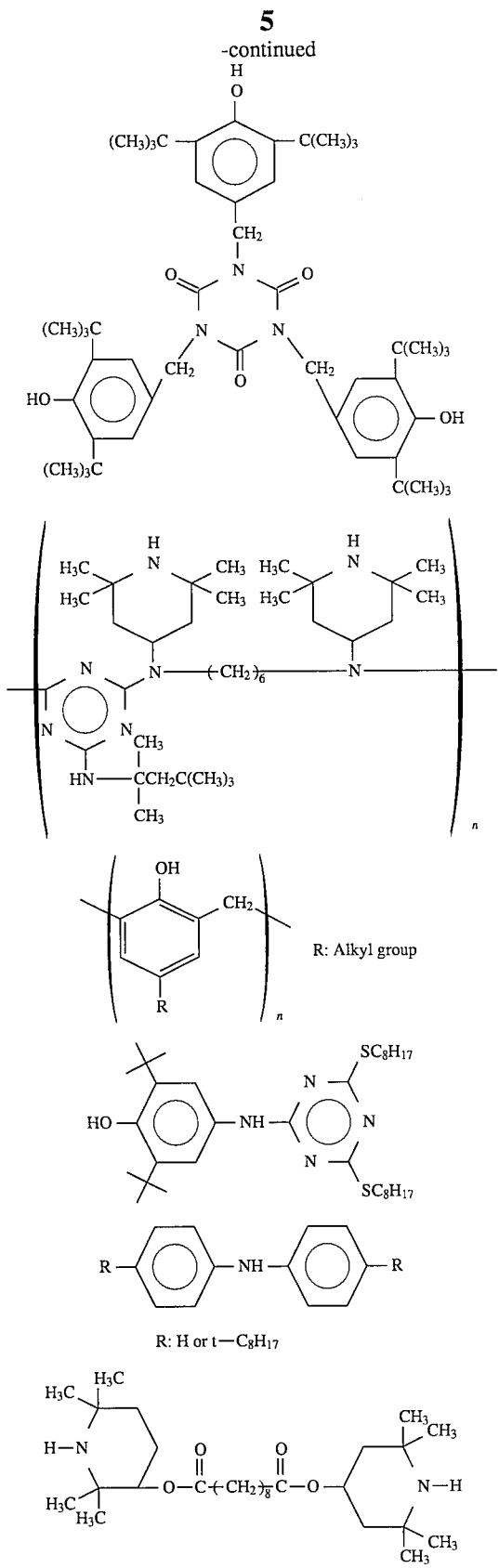

As to the compounds represented by the formula (D) described above, the compound having a molecular weight of at least 2,500 is preferably used. In addition, the compound represented by the formula (A) described above is also commercially available as IRGANOX 1010, the compound represented by the formula (B) is commercially available as IRGANOX 1330, the compound represented by the formula (C) is commercially available as IRGANOX 3114, and the compound represented by the formula (D) is commercially available as CHIMASSORB 944, etc., (trade names, made by CIBA-GEIGY (Japan) Limited).

The compound represented by the formula (F) shown above is commercially available as IRGANOX 565, the compound represented by the formula (G) is commercially available as IRGANOX 5057, and the compound represented by the formula (H) is commercially available as TINUVIN 770 (trade names, made by CIBA-GEIGY (Japan) Limited).

As the phenol series compound used as the high-polar additive, phenol series resins such as a phenol resin and an alkylphenol series resin having an alkyl group having at least 3 carbon atoms at the side chain thereof, e.g., a tertiary butylphenol resin, a tertiary amylphenol resin, and a tertiary octylphenol resin; modified phenol resins such as a rosin-denatured phenol resin, a terpene-denatured phenol resin, etc., can be preferably used.

The high-polar additives can be used alone or as a mixture thereof, and the effect of the present invention is advantageously obtained in a specific compounding amount of the high-polar additive. The compounding amount of the high-polar additive is from 0.05 to 5 parts by weight, preferably from 0.1 to 3 parts by weight, and more preferably from 0.2 to 1 part by weight, per 100 parts by weight of the rubber-based polymer.

If the compounding amount thereof is less than 0.05 part by weight, as the case may be, the addition effect becomes poor and if the compounding amount is over 5 parts by weight, the additive remains in the state of being transferred to the paint film, whereby the improvement of the adhesive force is not obtained and also the paint film is liable to be stained.

As the case may be, it is preferred to use at least one kind of the phenol series compound together with at least one kind of the amine series compound. The compounding ratio of these compounds is properly selected, but it is necessary that at least one of these compounds exists in an amount of at least 10% by weight, and preferably at least 20% by weight, based on the total weight of the high-polar additive.

If the proportion of one of these compounds becomes less than 10% by weight, the effect of using both the compounds together becomes poor and the effect of improving the adhesive property is reduced.

The paint film-protective sheet of the present invention can be formed according to a known method of forming an adhesive sheet such as a method of preparing a rubber-based polymer solution compounded with the high-polar additive using an appropriate solvent such as toluene, hexane, cyclohexane, heptane, etc., and coating the solution on a supporting substrate or a method of transferring a pressure-sensitive adhesive layer formed on a separator onto a supporting substrate.

The thickness of the pressure-sensitive adhesive layer formed on the supporting substrate may be appropriately determined, and generally is 100 μm or less, preferably from 1 to 50 μm, and more preferably from 3 to 20 μm. If necessary, the pressure-sensitive adhesive layer is protected by temporarily attaching thereto a separator, etc., before the practical use.

In the formation of the paint film-protective sheet, various compounding agents such as polymers, tackifiers, softeners, fillers, pigments, antioxidants, and stabilizers can be added, if necessary, to the rubber-based pressure-sensitive layer.

The compounding agents are properly used in the range such that the high-polar additives, etc., can keep the specific compatible state, the adhesive properties, etc., as described above.

Examples of the polymers used as the compounding agents include a poly(meth)acrylic acid ester, polybutadiene, polystyrene, polyisoprene, poly α-olefin, a natural rubber, polyester, polyurethane, polyacrylonitrile, and polyamide. Examples of the tackifiers include an epoxy resin and a coumarone-indene resin. Examples of the softeners include a process oil and a petroleum series softener. Examples of the fillers or pigments include calcium oxide, magnesium oxide, silica, titanium oxide, and zinc oxide.

The paint film-protective sheet of the present invention is preferably used for the surface protection of adherends such as automobile bodies and parts, steel plates, metal plates, and the moldings thereof each having formed thereon a paint film such as a polyester-melamine series paint film, a melamine-alkyd series paint film, an acryl-urethane series paint film, an epoxy functional acrylic resin-polyacid series paint film, an acryl-melamine series paint film, etc., in particular, a paint film containing therein bleeding components such as unreacted low molecular weight components, leveling agents, etc., which are liable to cause poor adhesion, from the collision of fine substances, chemicals, etc. In particular, the paint film-protective sheet of the present invention can be advantageously used in the case which involves temperature raising such as an outdoor transportation and in the case that the protective sheet is adhered over a long period of time.

The present invention is described below in more detail by reference to the following examples and comparative examples, but it should be understood that the invention is not construed as being limited thereto. Unless otherwise indicated, all percents, parts, ratios and the like are by weight.

EXAMPLE 1

A solution prepared by dissolving 100 parts of polyisobutylene having a polystyrene converted weight average molecular weight (hereinafter the same) of 870,000 by GPC (gel permeation chromatography) and 1 part of 1,3,5-trimethyl-2,4,6-tris(3,5-di-t-butyl-4-hydroxybenzyl)benzene (SP value: 10.4, molecular weight: 775) represented by the formula (B) described above in 700 parts of toluene was coated on a polypropylene film having a thickness of 40 μm and dried at 80° C. for 3 minutes to obtain a paint film-protecting sheet having thereon a rubber-based pressure-sensitive adhesive layer having a thickness of 10 μm.

EXAMPLE 2

By following the same procedure as in Example 1 using a solution prepared by dissolving 90 parts of polyisobutylene having a weight average molecular weight of 870,000, 10 parts of polyisobutylene having a weight average molecular weight of 30,000 and 0.5 part of pentaerythrityl-tetrakis[3-(3,5-di-t-butyl-4-hydroxyphenyl)propionate (SP value 10.6, molecular weight: 1178) represented by the formula (A) described above in 700 parts of toluene, a paint film-protective sheet was obtained.

EXAMPLE 3

By following the same procedure as in Example 1 using a solution prepared by dissolving 90 parts of polyisobutylene having a weight average molecular weight of 870,000, 10 parts of polyisobutylene having a weight average molecular weight of 30,000 and 3 parts of tris-(3,5-di-t-butyl-4-hydroxybenzyl)isocyanurate (SP value: 11.9, molecular weight: 784, and hereinafter the same) represented by the formula (C) described above in 700 parts of toluene, a paint film-protective sheet was obtained.

EXAMPLE 4

By following the same procedure as in Example 1 using a solution prepared by dissolving 100 parts of a butyl rubber having a weight average molecular weight of 450,000 and 1 part of tris-(3,5-di-t-butyl-4-hydroxybenzyl)-isocyanurate in 700 parts of toluene, a paint film-protective sheet was obtained.

EXAMPLE 5

By following the same procedure as in Example 1 using a solution prepared by dissolving 70 parts of a hydrogenated styrene.butadiene.styrene block (KRATON G-1657, trade name, made by Shell Chemical Co.), 30 parts of petroleum series hydrogenated resin (ARKON P-100, trade name, made by Arakawa Kagaku K. K.), and 1 part of tris-(3,5-di-t-butyl-4-hydroxybenzyl)-isocyanurate in 700 parts of toluene, a paint film-protective sheet was obtained.

EXAMPLE 6

By following the same procedure as in Example 1 using a solution prepared by dissolving 90 parts of polyisobutylene having a weight average molecular weight of 870,000, 10 parts of polyisobutylene having a weight average molecular weight of 80,000, and 0.5 part of poly [{6-(1,1,3,3-tetramethylbutyl)-amino-1,3,5-triazine-2,4-diyl}{(2,2,6,6-tetramethyl-4piperidyl)imino}hexamethylene{(2,2,6,6-tetramethyl-4-piperidyl)imino}] (SP value: 9.8, molecular weight: 2,500 or more) represented by the formula (D) described above, a paint film-protective sheet was obtained. In this case, the thickness of the rubber-based pressure-sensitive adhesive layer was 15 μm.

EXAMPLE 7

By following the same procedure as in Example 6 except that 0.8 part of an alkylphenol resin [molecular weight: 1,100 g/mol, SP value 12.2 (cal/cm$^3$)$^{1/2}$] was used in place of poly [{6-(1,1,3,3-tetramethylbutyl)-amino-1,3,5-triazine-2,4-diyl}{(2,2,6,6-tetramethyl-4-piperidyl)imino}hexamethylene{(2,2,6,6-tetramethyl-4-piperidyl)imino}], a paint film-protective sheet was obtained.

COMPARATIVE EXAMPLE 1

By following the same procedure as in Example 1 using a solution prepared by dissolving 90 parts of polyisobutylene having a weight average molecular weight of 870,000 and 10 parts of polyisobutylene having a weight average molecular wight of 30,000 in 700 part of toluene, a paint film-protective sheet was obtained.

COMPARATIVE EXAMPLE 2

By following the same procedure as in Example 1 using a solution prepared by dissolving 90 parts of polyisobutylene having a weight average molecular weight of 870,000, 10 parts of polyisobutylene having a weight average molecular weight of 100,000, and 1 part of bis(2,2,6,6-tetramethyl-4-piperidyl)sebacate (SP value: 9.6, molecular weight: 481) in 700 parts of toluene, a paint film-protective sheet was obtained.

[Evaluation Test]

Each of the paint film-protective sheets (width 25 mm) obtained in the examples and the comparative examples described above was adhered to each of a plate having a sparingly adhesive acryl-melamine series paint film (AC/MF) having a contact angle with n-hexane of 15°, a plate having a polyester-melamine series paint film (PE/MF) having the contact angle of 32°, and a plate having an acryl-urethane series paint film (AC/UR) having the contact angle of 32° at 23° C., and the adhesive force (180° peeling, peeling speed 300 mm/minute) after 30 minutes or 48 hours was determined.

The contact angle was measured by the following method.

About 2 μl of n-hexadecane was dropped on each coated plate (i.e., the plate having each paint film) and the angle formed by the coated plate and the tangent of the edge portion of the liquid drop was measured in the atmosphere of 23° C. and 60% RH within one minute. In addition, each coated plate was prepared by applying a primer onto a 0.8 mm thick steel plate by an electrodeposition, applying an intermediate coating, and applying a top coating (i.e., an acryl-melamine coating composition, a polyester-melamine coating composition, or an acryl-urethane coating composition).

The results obtained are shown in Table 1.

EXAMPLE 9

By following the same procedure as in Example 8 using a solution prepared by dissolving 90 parts of polyisobutylene having a weight average molecular weight of 870,000, 10 parts of polyisobutylene having a weight average molecular weight of 90,000, 0.15 part of an alkylphenol resin having a weight average molecular weight of about 850 and an SP value of 10.3, and 0.1 part of poly [{6-(1,1,3,3-tetramethylbutyl)amino-1,3,5-triazine-2,4-diyl}{2,2,6,6-tetramethyl-4-piperidyl)imino}hexamethylene{(2,2,6,6-tetramethyl-4-piperidyl)imino}] represented by the formula (D) described above, a paint film-protective sheet was obtained.

EXAMPLE 10

By following the same procedure as in Example 8 using a solution prepared by dissolving 90 parts of polyisobutylene having a weight average molecular weight of 870,000, 10 parts of polyisobutylene having a weight average molecular weight of 90,000, 0.3 part of an alkylphenol resin having a weight average molecular weight of about 930 and an SP value of 11.3, and 0.2 part of 2,4-bis-(n-octylthio)-6-(4-hydroxy-3,5-di-t-butylanilino)-1,3,5-triazine in 700 parts of toluene, a paint film-protective sheet was obtained.

COMPARATIVE EXAMPLE 3

By following the same procedure as in Example 8 using a solution prepared by dissolving 90 parts of polyisobuty-

TABLE 1

| | | Example | | | | | | | Compara. Example | |
|---|---|---|---|---|---|---|---|---|---|---|
| | | 1 | 2 | 3 | 4 | 5 | 6 | 7 | 1 | 2 |
| Adhesive force (N/25 mm) | | | | | | | | | | |
| AC/MF: | After 30 minutes | 3.0 | 2.5 | 7.3 | 6.2 | 2.4 | 4.4 | 7.5 | 0.2 | 0.2 |
| | After 48 hours | 5.0 | 5.2 | 8.7 | 8.3 | 8.3 | 5.6 | 8.9 | 0.3 | 0.3 |
| PE/MF: | After 30 minutes | 2.6 | 2.0 | 6.0 | 5.1 | 2.2 | 4.4 | 6.6 | 0.2 | 0.3 |
| | After 48 hours | 4.2 | 4.5 | 8.8 | 7.9 | 5.1 | 6.5 | 8.5 | 0.4 | 0.3 |
| AC/UR: | After 30 minutes | 3.0 | 2.2 | 7.8 | 6.6 | 2.8 | 4.7 | 7.7 | 0.2 | 0.2 |
| | After 48 hours | 5.9 | 5.2 | 9.0 | 8.5 | 6.8 | 8.0 | 9.2 | 0.3 | 0.4 |

EXAMPLE 8

A solution prepared by dissolving 100 parts of polyisobutylene having a polystyrene converted weight average molecular weight of 870,000 by GPC (gel permeation chromatography) (hereinafter the same), 0.2 part of an alkylphenol resin having a t-butyl group as the alkyl group, a weight average molecular weight of about 700, and a SP value of 11.3, and 0.1 part of bis(2,2,6,6-tetramethyl-4-piperidyl)sebacate represented by the formula (H) described above in 700 parts of toluene was coated on a polypropylene film having a thickness of 40 μm and dried at 80° C. for 3 minutes to obtain a paint film-protective sheet having thereon a rubber-based pressure-sensitive layer having a thickness of 10 μm.

lene having a weight average molecular weight of 870,000 and 10 parts of polyisobutylene having a weight average molecular weight of 30,000 in 700 parts of toluene, a paint film-protective sheet was obtained.

COMPARATIVE EXAMPLE 4

By following the same procedure as in Example 8 using a solution prepared by dissolving 90 parts of polyisobutylene having a weight average molecular weight of 870,000, 10 parts of polyisobutylene having a weight average molecular weight of 80,000, and 1 part of bis(2,2,6,6-tetramethyl-4-piperidyl)sebacate (SP value: 9.6, molecular weight: 481) in 700 parts of toluene, a paint film-protective sheet was obtained.

The adhesive force of each of the paint film-protective sheets obtained in the examples and the comparative examples described above was evaluated by the same manner as described above.

The results obtained are shown in Table 2 below.

TABLE 2

|  |  | Example | | | Comparative Example | |
|---|---|---|---|---|---|---|
|  |  | 8 | 9 | 10 | 3 | 4 |
| Adhesive force (N/25 mm) | | | | | | |
| AC/MF: | After 30 min. | 2.8 | 2.2 | 2.8 | 0.2 | 0.2 |
|  | After 48 hrs. | 5.7 | 5.0 | 5.9 | 0.3 | 0.3 |
| PE/MF: | After 30 min. | 3.0 | 2.5 | 3.4 | 0.2 | 0.3 |
|  | After 48 hrs. | 5.8 | 5.4 | 6.3 | 0.4 | 0.3 |
| AC/UR: | After 30 min. | 3.3 | 2.9 | 3.3 | 0.2 | 0.2 |
|  | After 48 hrs. | 7.8 | 7.0 | 8.0 | 0.3 | 0.4 |

The paint film-protective sheet of the present invention shows a good adhesive force even to a paint film showing a poor adhesion by bleeding, maintains the adhered state over a long period of time, shows a good peeling property at peeling and can be easily peeled without leaving wastes, which become staining materials of the paint film, whereby the paint film-protective sheet can be practically used without need of applying a cleaning treatment onto paint films.

While the invention has been described in detail and with reference to specific embodiments thereof, it will be apparent to one skilled in the art that various changes and modifications can be made therein without departing from the spirit and scope thereof.

What is claimed is:

1. A paint film-protective sheet comprising a supporting substrate having formed thereon a pressure-sensitive adhesive layer, said layer comprising i) a rubber-based polymer with a solubility parameter of less than or equal to 8.1 $(cal/cm^3)^{1/2}$ and an aliphatic unsaturated carbon-to-carbon bond content of less than or equal to 5%, and ii) an additive having a high polarity, said additive having a molecular weight of at least 500 g/mol and a solubility parameter of at least 9.5 $(cal/cm^3)^{1/2}$.

2. The paint film-protective sheet according to claim 1, wherein the rubber-based polymer is at least one selected from the group consisting of polyisobutylene and butyl rubber, and the additive is at least one selected from the group consisting of a phenol series compound and an amine series compound.

3. The paint film-protective sheet according to claim 1, wherein the additive is present in an amount of from 0.05 to 5 parts by weight per 100 parts by weight of the rubber based polymer.

4. The paint film-protective sheet according to claim 2, wherein the phenol series compound or the amine series compound is a hindered series compound.

5. The paint film-protective sheet according to claim 2, wherein the phenol series compound is an alkylphenol resin.

6. The paint film-protective sheet according to claim 2, wherein the amine series compound is at least one selected from the group consisting of a primary amine compound and a secondary amine compound.

7. The paint film-protective sheet according to claim 4, wherein the hindered compound is a compound represented by following formula (A), (B), (C), or (D);

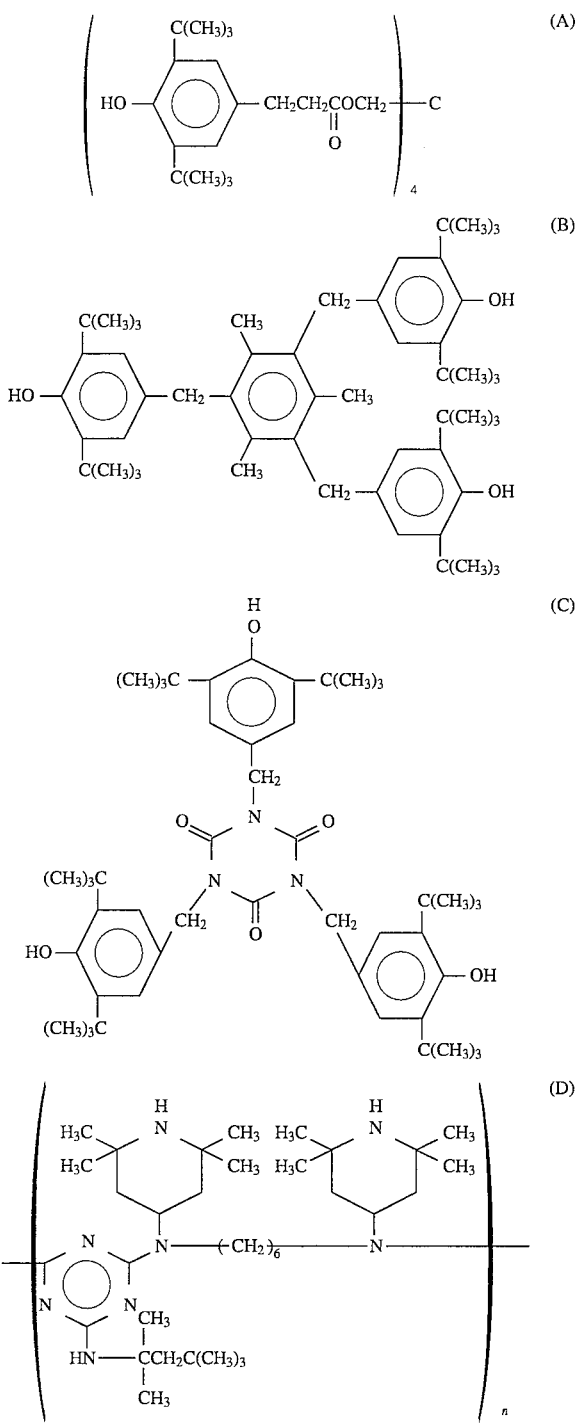

* * * * *